United States Patent Office 3,175,785
Patented Mar. 30, 1965

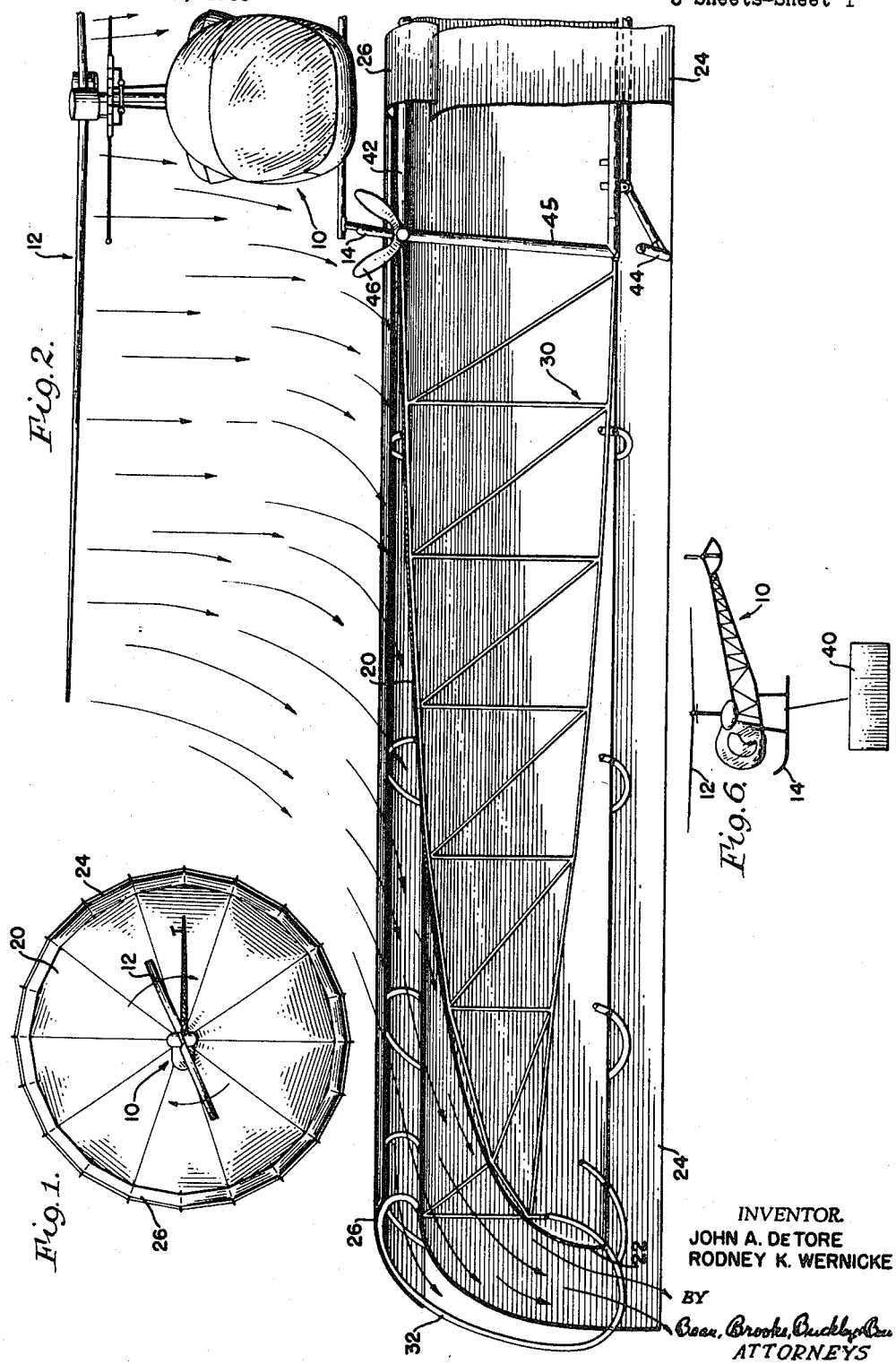

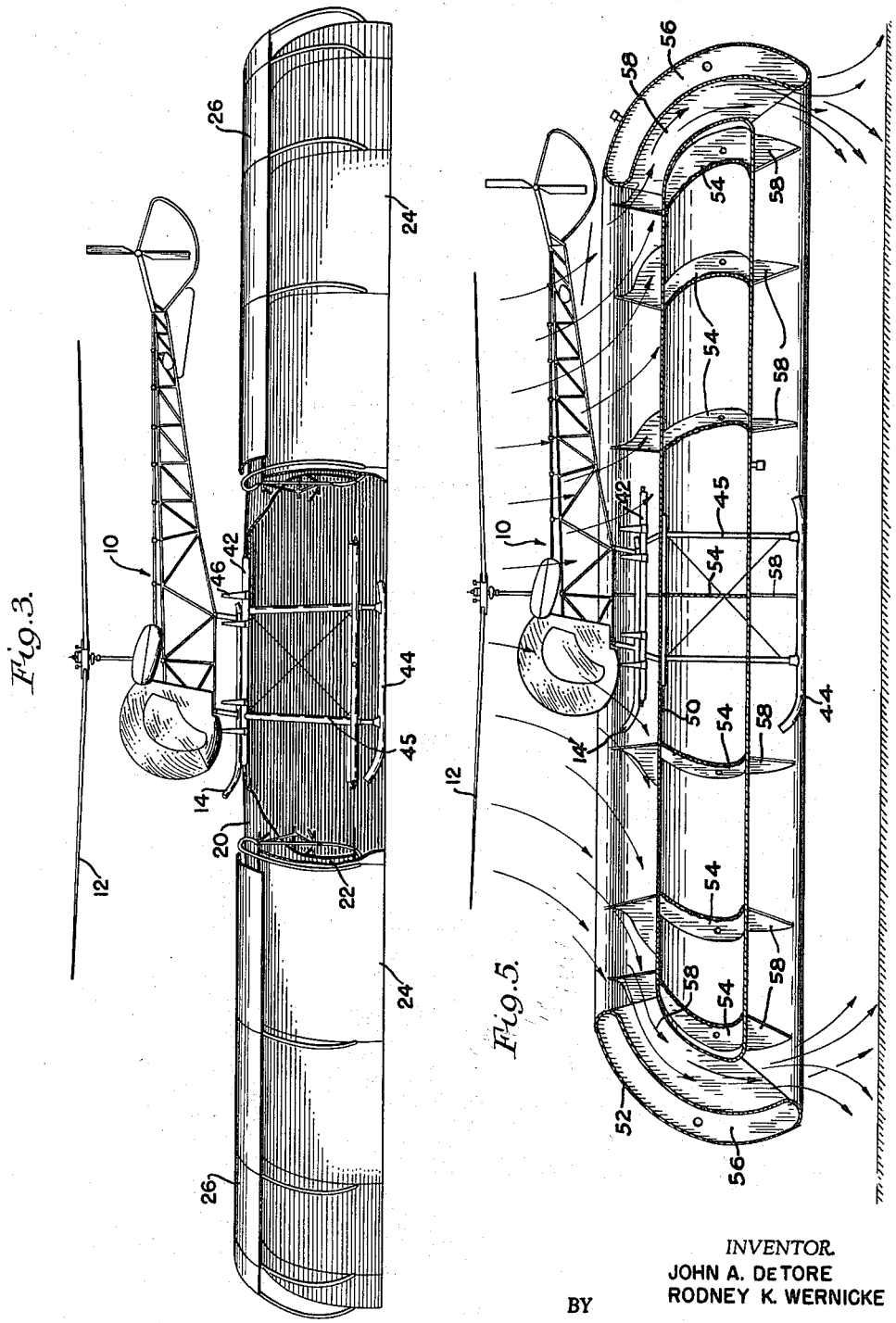

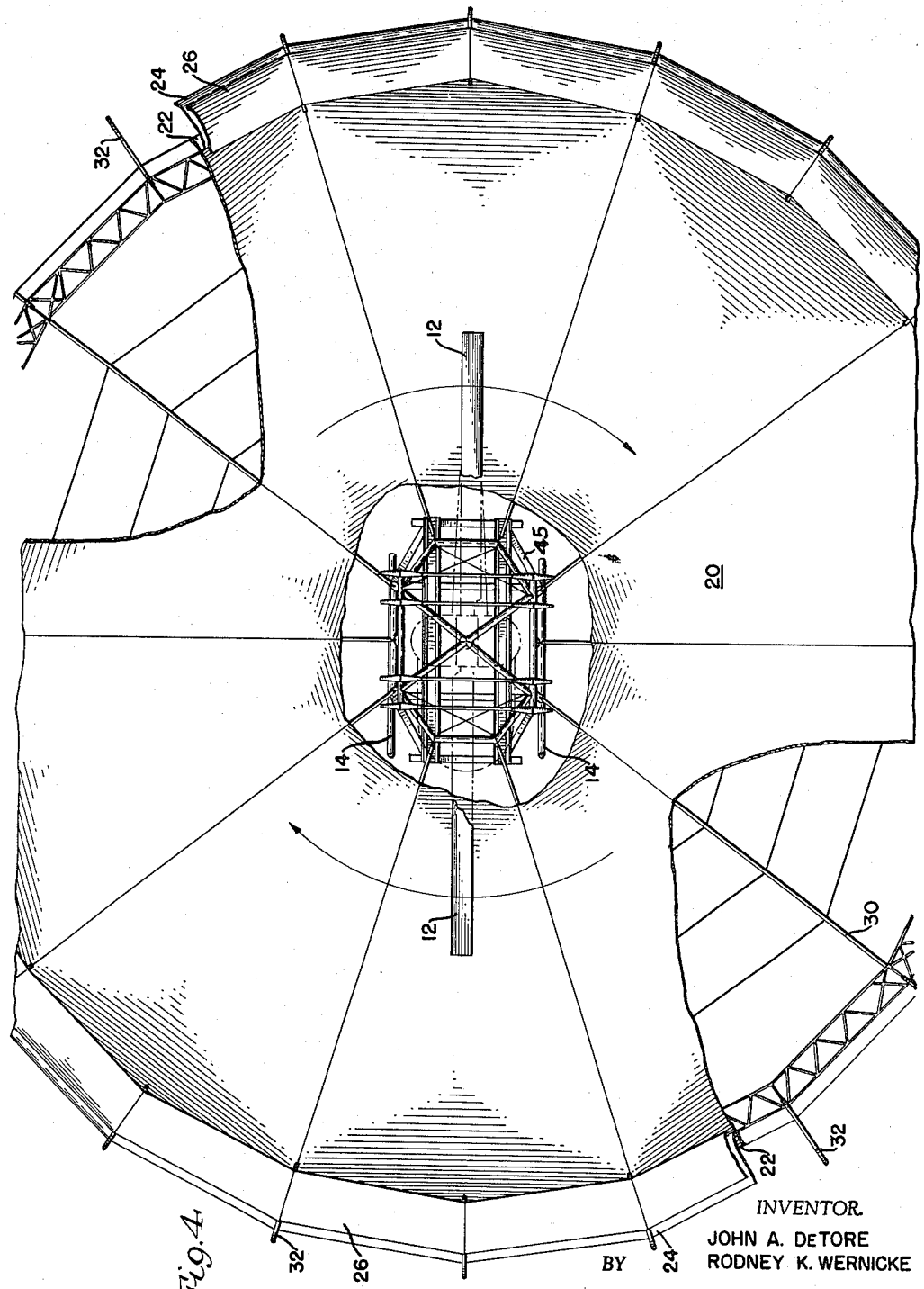

3,175,785
COMBINATION ROTARY WING AND GROUND EFFECT MACHINE
John A. De Tore, Arlington, and Rodney K. Wernicke, Hurst, Tex., assignors to Bell Aerospace Corporation, Wheatfield, N.Y.
Filed June 20, 1963, Ser. No. 289,230
8 Claims. (Cl. 244—17.11)

This invention relates to rotary wing aircraft, and in particular to means for providing such craft with increased load lift and transport capabilities. Whereas the conventional helicopter type, for example, is a versatile and efficient machine for operating at "aircraft" heights, its gross weight-to-payload ratio is usually no better than five-to-two. On occasion however it would be highly desirable for such a craft to be able to pick up and transport at elevations close to ground level, substantially heavier loads than normally possible. For example, in connection with military or commercial field operations, loads in excess of the lift capacities of conventional craft are sometimes required to be ferried across rivers, bogs, marshes, snow, mudholes or the like; and it is a prime object of the present invention to provide a novel vehicle form which may be easily and quickly converted to either an efficient "ground effect" craft of great load lift capacity or an efficient rotary wing aircraft of lesser load lift capacity but operational at higher altitudes.

Another object of the invention is to provide a novel conversion device such as may be easily and quickly attached to an existing rotary wing aircraft to greatly increase the load lift capacities thereof.

Another object is to provide a "ground effect" machine of novel steering and maneuvering control facilities.

Another object is to provide a conversion device as aforesaid which may be furnished in "knock-down" form and thereby easily stored and transported in packaged form to any desired site of intended use, whereby a rotary wing craft may be flown in conventional manner to the site and there converted to an "air cushion" type vehicle.

Still another object is to provide a novel hybrid type machine which is readily convertible so as to possess either the operational characteristics for example of a helicopter, or alternatively the operational characteristics of a ground effect machine.

Another object of the invention is to provide a novel fabrication adapted to be employed as an adjunct to a conventional rotary wing aircraft for purposes as set forth hereinabove, which fabrication when not in use may be readily collapsed and packaged for transport with utmost facility by the same aircraft to the intended site of "ground effect machine" type operation.

Generally stated, the invention contemplates accomplishment of the above stated objectives by provision of a platform-like structure upon which a rotary wing type aircraft may be mounted; said structure being arranged to entrain the airstream downwash from the lift rotor of the craft within an air duct delivering the airflow in the form of an annular jet into a hollow space under the platform, thereby creating an air cushion or "ground effect" operating to lift the platform and helicopter as a unit. As will be explained hereinafter, such an arrangement when properly designed is capable of lifting as much as three times the payload lifted by the same craft when operating without the platform and as a rotary wing aircraft at the same engine-rotor output. When so converted to a "ground effect machine" type craft it is operational at elevations relatively close to a ground or water surface, compared to a typical rotary wing flight type of operation. Also, it is then steerable and/or otherwise maneuverable through pilot-control of the helicopter tail rotor operation and/or through pilot-control of the helicopter lift rotor cyclic pitch change mechanism. By way of further illustration and explanation of the invention reference will now be made to the following specification which exemplifies certain physical embodiments of the invention, as illustrated in the accompanying drawing wherein:

FIG. 1 is a top plan view of a presently standard type helicopter mounted upon a platform device in accordance with the invention, whereby to provide a hybrid helicopter-ground-effect-machine as explained hereinabove;

FIG. 2 is an enlarged scale fragmentary front elevational view of the machine of FIG. 1, with portions thereof broken away to show interior construction;

FIG. 3 is a side elevational view thereof with portions broken away to show interior parts of the platform construction;

FIG. 4 is an enlarged scale fragmentary plan view of the devices of FIGS. 1-3, with portions broken away to show interior structure;

FIG. 5 is a view corresponding to FIG. 2, but illustrating a modified form of platform construction; and FIG. 6 is a side elevational "fly away" view illustrating how the machine may operate as a helicopter and transport with facility the accessory platform fabrication while in "knock-down" condition.

As shown in FIGS. 1-4 the invention may be embodied to employ a standard type helicopter as indicated generally at 10, having a lift rotor as indicated at 12 and an undercarriage including skid bars 14. Thus, the component just referred to comprises a conventional rotary wing type aircraft adapted for flight operations at typical "aircraft" heights. However, in accord with the present invention an accessory device for detachable connection to the helicopter is provided to comprise generally a dome-shaped platform 20 which is circular in plan view and of substantially twice the diameter of the span of the rotor 12. The peripheral portion of the platform 20 is smoothly downturned and terminates in a substantially vertical peripheral wall portion 22. An encircling cowl 24 is provided in spaced relation with the wall portion 22 to provide an annular duct for passage of air therethrough downwardly against a reactive surface in the form of a pheripheral air jet.

Thus, as illustrated in FIG. 2, when the components of the machine of the invention are relatively assembled, and the helicopter-engine rotor unit is in operation, the rotor 12 will produce a down blast of air as shown by the arrows. This "downwash" against the top surface of the platform 20 is deflected thereby to travel radially thereover and thence into the annular duct formed by the peripheral wall 22 of the platform and the surrounding cowl 24. The peripheral air jet thus formed is thereby directed to impinge against the vehicle supporting surface, whether it be ground terrain or a water surface, snow, ice, marsh, bog, or the like. This operates to form an air cushion pressing upwardly against the bottom surface of the platform and tending to lift it relative to the ground or water surface. As indicated at 26, FIG. 2, a secondary cowling may also be provided in vertical spaced relation to the primary cowling 24, to insure entrainment of the upper portion of the air stream such as might otherwise tend to spill over the outside of the main cowling 24. Thus, the secondary cowling 26 will receive and deflect any such air stream downwardly in parallel with the air stream conveyed through the duct formed by the side wall 22 and the main cowling 24, to augment the lift producing effect of the latter.

The "ground effect" producing component of the machine of the invention may be fabricated of any preferred form, and may for example be constructed as shown in the drawing at FIGS. 1–4 herewith to comprise lightweight truss members indicated generally at 30 extending radially of the plan view center of the platform, and interconnected at the periphery of the structure by tie struts or the like. The cowling devices 24, 26 may be supported upon the same basic framework as by means of intermediate strut devices 32 such as are shown for example in FIGS. 2, 4 herewith, and the framing structures may be covered by any suitable deck forming devices such as fabric, or sheet metal, or plastic sheeting, or the like.

It will be appreciated that the platform structure may be of modular or other readily "knock-down" type construction. Thus, the entire platform and cowling unit may be disassembled and compactly bundled to facilitate its transportation, as within a single carrying case indicated at 40, FIG. 6. Thus, whenever the machine is assigned to a "heavy load" transport operation commencing at a different point, the "ground effect" platform portion of the machine may be carried in packaged form as shown in FIG. 6, by the helicopter component of the unit, to the site of the intended "heavy lift" operation. Upon arrival, the platform structure will be unpackaged and set up into operational form as illustrated in the drawing herewith, whereupon the helicopter component will then be maneuvered to alight upon the top center portion of the platform with the under carriage rails 14 resting upon complementary shaped support rails 42 (FIG. 3) carried by the platform truss structure. As indicated at 44, ground support skids are preferably provided at the bottom of a load support and carrying truss structure 45 at the core of the platform construction. As indicated at 46 (FIG. 2) U-shaped guide brackets or the like may be employed in conjunction with the supporting frame members 42 to guide the helicopter undercarriage into properly seated position. Any suitable provision may be made of course for mounting the load to be transported relative to the support truss 45; and thus the machine may now be operated as a heavy load-carrying "ground effect" machine while maneuvering control thereof is effected by pilot regulations of the tail rotor operation and cyclic pitch controlling of the lift rotor mechanism. Hence a "ground effect" machine of novel and improved maneuvering control facilities has been provided.

Alternatively, as illustrated by FIG. 5, the platform and cowling elements may be provided of simple inflatable bag type constructions. Thus, the platform element may be fabricated to comprise an airtight cell as indicated at 50 which will assume, when inflated, a "pancake" form. The cowling element may likewise comprise an airtight cell which when inflated will assume a toroidal form as indicated at 52. Fabric webs as indicated at 54, 56, 58 may be provided internally of the cells 50 and 52 and as interconnection device therebetween, to shape-control and stabilize the cells when inflated in the forms illustrated in FIG. 5 so as to provide the desired platform and cowl effects as explained hereinabove. When deflated the cells 50, 52 may of course be readily folded and/or compacted into a small bundle for easy transport; and it will of course be appreciated that any preferred form of pneumatic pressure supply may be employed for cell inflation purposes.

Although only a few forms of the invention have been illustrated and described in detail hereinabove, it will be understood that various changes may be made therein without departing from the spirit of the invention or the scope of the following claims.

We claim:
1. A lift capacity increase mechanism adapted for attachment to a rotary wing aircraft having a lift rotor system for producing a downward column of air, said mechanism comprising, a platform upon which a rotary wing aircraft is adapted to be mounted in positionally stable manner, said platform having a main top surface of generally flat configuration adapted to direct the downwash column of air generated by operation of a rotary wing aircraft lift rotor system in radially outward direction, said platform having a downwardly curving peripheral portion extending radially beyond said main top surface and a vertical wall portion extending downwardly from said peripheral portion, a cowling encircling said peripheral portion of the platform and arranged in substantially parallel spaced relation thereto and having a a frontal edge portion located above the elevation of said peripheral portion and cooperating therewith to receive and confine therebetween radially flowing air and deflect it downwardly around the peripheral and vertical wall portions of said platform to discharge therebelow in the manner of a peripheral jet, ground contact means carried by said platform and extending therebelow to shield the vertical wall of said platform and said cowling from ground contacts.

2. The mechanism as defined in claim 1 wherein said platform and said cowling each comprise sectional fabrications of strut members and sheet members adapted for ready assembly-disassembly to facilitate transport of the mechanism in disassembled compact form.

3. The mechanism as defined in claim 1 wherein said platform and said cowling are air inflated flexible envelope devices adapted to be transported, when not in use, in deflated and compactly packaged form.

4. A lift capacity increase device for attachment to a rotary wing aircraft having a lift rotor system for producing a downward column of air, said device comprising, a platform having means for detachably mounting a rotary wing aircraft thereon, said platform having a top surface portion disposed to receive the downwash column of air generated by operation of a rotary wing aircraft lift rotor system and direct the same radially outwardly, said platform having a downwardly curving boundary portion and a vertical wall portion extending downwardly from said boundary portion, and a cowling encircling said boundary portion in spaced relation thereto and including a portion spaced above said boundary portion and cooperating therewith to receive and confine therebetween radially outwardly flowing air and deflect it downwardly around the boundary and vertical wall portions of said platform to discharge therebelow in the manner of a peripheral jet.

5. A lift capacity increase mechanism adapted for attachment to a rotary wing aircraft having a lift rotor system for producing a downward column of air, said mechanism comprising, a platform upon which a rotary wing aircraft is adapted to be mounted in positionally stable manner, said platform having a main top surface of generally flat configuration adapted to direct the downwash column of air generated by operation of a rotary wing aircraft lift rotor system in radially outward direction, said platform having a downwardly curving boundary portion extending radially beyond said main top surface and a vertical side wall portion extending downwardly from said boundary portion, a first cowling encircling said boundary portion and arranged in substantially parallel spaced relation thereto and having a frontal edge portion located above the elevation of said boundary portion and cooperating therewith to receive and confine therebetween radially outwardly flowing air and to deflect it downwardly around the boundary and vertical side wall portions of said platform to discharge therebelow in the manner of a peripheral jet, and a second cowling encircling said first cowling in spaced generally parallel relation thereto in the region of its frontal edge to circumvent spillage of radially flowing air from the intake of the annular duct formed by said platform side wall and said first cowling.

6. A lift capacity increase mechanism adapted for attachment to a rotary wing aircraft having a lift rotor system for producing a downward column of air, said mechanism comprising, a platform upon which a rotary wing aircraft is adapted to be mounted in positionally stable manner, said platform having a top surface of generally flat configuration adapted to direct the downwash column of air generated by operation of a rotary wing aircraft lift rotor system in radially outward direction, said platform having a downwardly curving peripheral portion extending radially beyond said top surface, and a cowling encircling said peripheral portion and cooperating therewith to form an annular duct having an intake mouth located above the elevation of said top surface and a discharge mouth directed to discharge air below the platform in the manner of a peripheral jet.

7. A composite ground effect machine comprising
 a rotary wing aircraft having a fuselage, a rotary wing mounted on said fuselage for rotation about a generally vertical axis, and means for directionally controlling the aircraft, and in combination therewith,
 a platform assembly having a generally horizontal top surface portion, a peripheral surface portion curving downwardly fom the periphery of said top surface portion, and a vertical wall portion extending downwardly from said peripheral portion,
 a cowling mounted on said platform assembly in substantially parallel vertically spaced relation to said peripheral portion thereof,
 and means mounting said rotary wing aircraft on said top surface of the platform assembly to direct a downwash column of air created by the rotary wing of the aircraft downwardly against said top surface portion to flow radially outwardly thereof and downwardly between said vertical wall portion and said cowling in the manner of a peripheral jet.

8. A composite ground effect machine comprising,
 an aircraft having a fuselage, means for directionally controlling the aircraft, and propelling means for producing a downwardly directed downwash column of air, and in combination therewith,
 a body having a generally horizontal top surface portion and means disposed peripherally of said top surface portion defining a downwardly curving annular duct having a discharge mouth for directing a peripheral jet of air downwardly around said body,
 and means mounting said aircraft on said top surface portion of said body to direct the downwash column of air created by the propelling means of the aircraft against said top surface of the body to flow radially outwardly to and downwardly through said annular duct.

References Cited by the Examiner
UNITED STATES PATENTS

| | | | |
|---|---|---|---|
| 3,019,756 | 2/62 | Murri | 244—23 |
| 3,042,129 | 7/62 | Wade | 180—7 |
| 3,130,939 | 4/64 | Alper et al. | 244—2 |

FERGUS S. MIDDLETON, *Primary Examiner.*